(12) United States Patent
Tock et al.

(10) Patent No.: US 10,812,578 B2
(45) Date of Patent: Oct. 20, 2020

(54) MIGRATION OF DURABLE CLIENTS IN A CLUSTERED PUBLISH/SUBSCRIBE SYSTEM

(71) Applicant: International Business Machines Corporation, Armonk, NY (US)

(72) Inventors: Yoav Tock, Haifa (IL); Nir Naaman, Haifa (IL); Avraham Harpaz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 15/872,997

(22) Filed: Jan. 17, 2018

(65) Prior Publication Data
US 2019/0222640 A1 Jul. 18, 2019

(51) Int. Cl.
*H04L 29/08* (2006.01)
*G06F 9/54* (2006.01)
*H04L 12/24* (2006.01)
*H04L 29/06* (2006.01)

(52) U.S. Cl.
CPC .......... *H04L 67/1021* (2013.01); *G06F 9/542* (2013.01); *H04L 41/0816* (2013.01); *H04L 67/141* (2013.01); *H04L 67/42* (2013.01); *G06F 2209/544* (2013.01)

(58) Field of Classification Search
CPC ............. H04L 67/1021; H04L 41/0816; H04L 67/141; H04L 67/42; G06F 9/542; G06F 2209/544
See application file for complete search history.

(56) References Cited

U.S. PATENT DOCUMENTS 7,155,438 B2 * 12/2006 Potter ..................... G06F 9/542
7,574,511 B2   8/2009 Pujol et al.
8,521,882 B2   8/2013 Amsterdam et al.
(Continued)

OTHER PUBLICATIONS

Amozarrain et al., "Reliable Publish/Subscribe in Dynamic Systems", Technical Report EHU-KAT-IK-01-16, University of the Basque Country, Mar. 15, 2016.
(Continued)

*Primary Examiner* — Philip J Chea
*Assistant Examiner* — Robert B McAdams
(74) *Attorney, Agent, or Firm* — Ziv Glazberg

(57) ABSTRACT

Migration of a durable client in a publish/subscribe system from a first server of a cluster to a second server of the cluster. The method comprises the second server receiving subscription information of the durable client; the second server establishing a message queue for the durable client; the second server sending a switch command to all active servers of the cluster; in response to the second server obtaining, from an active server, an acknowledgement of the switch command, the second server inserting a marker to the message queue indicating switching point of the active server; and in response to the second server obtaining, from the first server, a message indicating the first server flushed all messages prior to respective switching points for all active servers, connecting the durable client to the second server and transmitting messages thereto by the second server. As a result, the durable client is migrated from the first server to the second server without disrupting data traffic to uninvolved clients.

16 Claims, 3 Drawing Sheets

(56) References Cited

U.S. PATENT DOCUMENTS

| | | | |
|---|---|---|---|
| 9,065,831 B2 | 6/2015 | Ghosh et al. | |
| 2006/0233322 A1* | 10/2006 | Allman | H04L 29/06027 |
| | | | 379/88.01 |
| 2016/0330282 A1* | 11/2016 | Paramasivam | G06F 9/5088 |
| 2017/0048169 A1* | 2/2017 | Hunt | H04L 51/30 |

OTHER PUBLICATIONS

Salvador et al., "Phoenix: A Protocol for Seamless Client Mobility in Publish/Subscribe", 2012 IEEE 11th International Symposium on Network Computing and Applications, pp. 111-120.

Barazzutti et al., "Elastic Scaling of a High-Throughput Content-Based Publish/Subscribe Engine", 2014 IEEE 34th International Conference on Distributed Computing Systems, 2014.

\* cited by examiner

US 10,812,578 B2

MIGRATION OF DURABLE CLIENTS IN A CLUSTERED PUBLISH/SUBSCRIBE SYSTEM

TECHNICAL FIELD

The present disclosure relates to information distribution among a cluster of servers in general, and to durable clients in a clustered publish/subscribe system, in particular.

BACKGROUND

Publish/subscribe (pub/sub) has become a popular communication paradigm that provides a loosely coupled form of interaction among many publishing data sources and many subscribing data sinks. One type of such system is topic-based pub/sub, wherein publishers associate each publication message with one or more specific topics, and subscribers register their interests in a subset of all topics. In many pub/sub systems clients interact with a single server, also referred to as "broker", that is responsible for providing the required pub/sub services, such as delivering a message published on a topic to clients that subscribed to this topic. In order to provide a large scale pub/sub service, multiple brokers are grouped together to form a cluster. The brokers in the cluster collaborate and exchange information in order to provide pub/sub service to a large group of clients.

Some Internet of Things (IoT) systems rely on the Message Queue Telemetry Transport (MQTT) protocol or other pub/sub protocols to offer advanced connectivity and communication between enterprise applications and IoT devices. A cloud-hosted IoT infrastructure may be expected to support tens or hundreds of millions of IoT devices. To accommodate such large-scale workloads, deployment of many MQTT brokers on geographically distributed data centers may be desired or required.

BRIEF SUMMARY

One exemplary embodiment of the disclosed subject matter is a method for durable client migration from a first server in a cluster of publish/subscribe system to a second server of the cluster, the method comprising: the second server receiving subscription information of the durable client; the second server establishing a message queue for the durable client; the second server sending a switch command to all active servers of the cluster; in response to the second server obtaining, from an active server, an acknowledgement of the switch command, the second server inserting a marker to the message queue indicating switching point of the active server; and in response to the second server obtaining, from the first server, a message indicating the first server flushed all messages prior to respective switching points for all active servers, connecting the durable client to the second server and transmitting messages thereto by the second server.

In some exemplary embodiments, the durable client is migrated from the first server to the second server without disrupting data traffic to uninvolved clients.

Another exemplary embodiment of the disclosed subject matter is a computer program product for migrating a durable client from a first server in a cluster of publish/subscribe system to a second server of the cluster, the computer program product comprising a non-transitory computer readable storage medium retaining program instructions, which program instructions when read by a processor, cause the processor to perform a method comprising: the second server receiving subscription information of the durable client; the second server establishing a message queue for the durable client; the second server sending a switch command to all active servers of the cluster; in response to the second server obtaining, from an active server, an acknowledgement of the switch command, the second server inserting a marker to the message queue indicating switching point of the active server; and in response to the second server obtaining, from the first server, a message indicating the first server flushed all messages prior to respective switching points for all active servers, connecting the durable client to the second server and transmitting messages thereto by the second server; whereby the durable client is migrated from the first server to the second server without disrupting data traffic to uninvolved clients.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

Figure 2A:
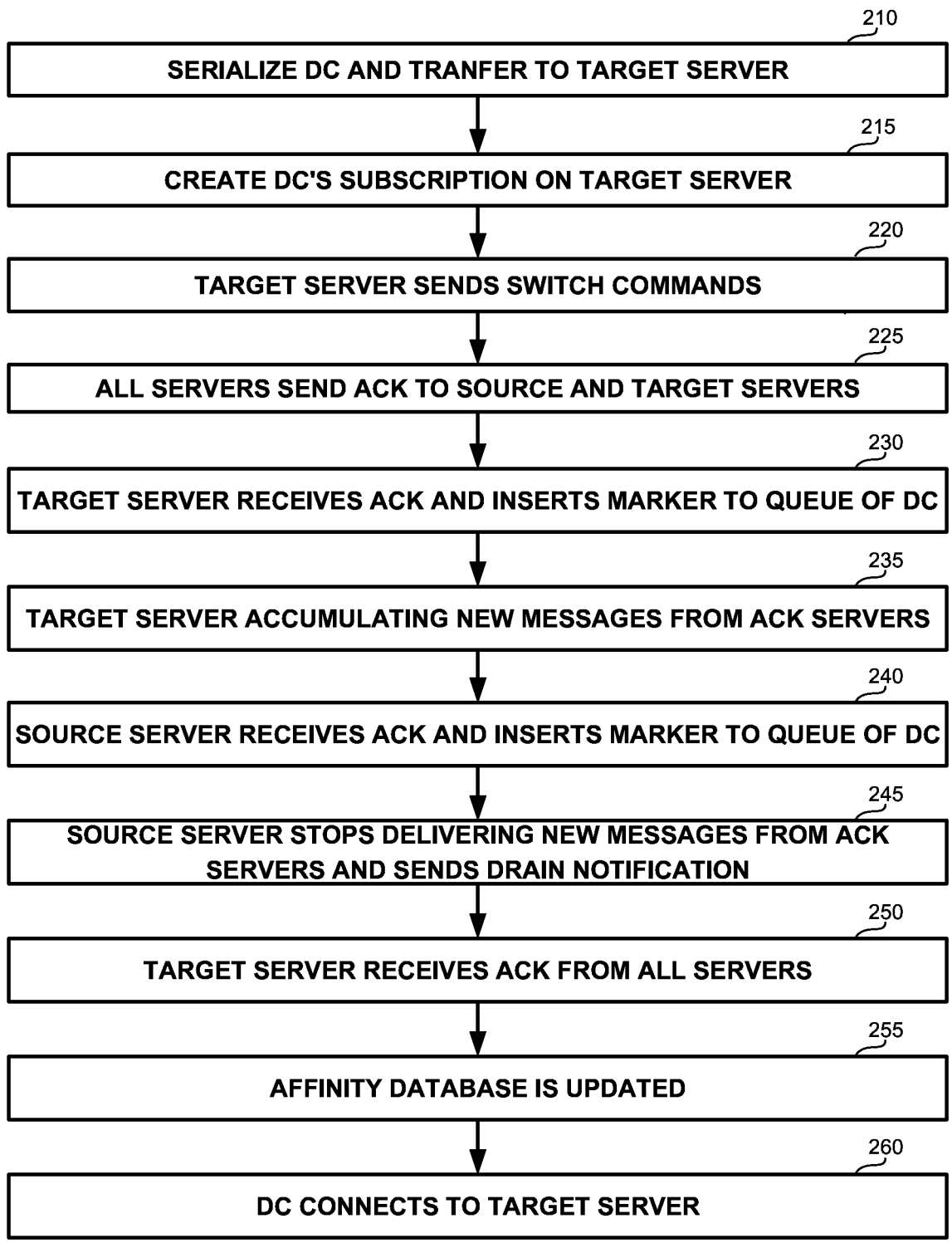
Figure 2B:
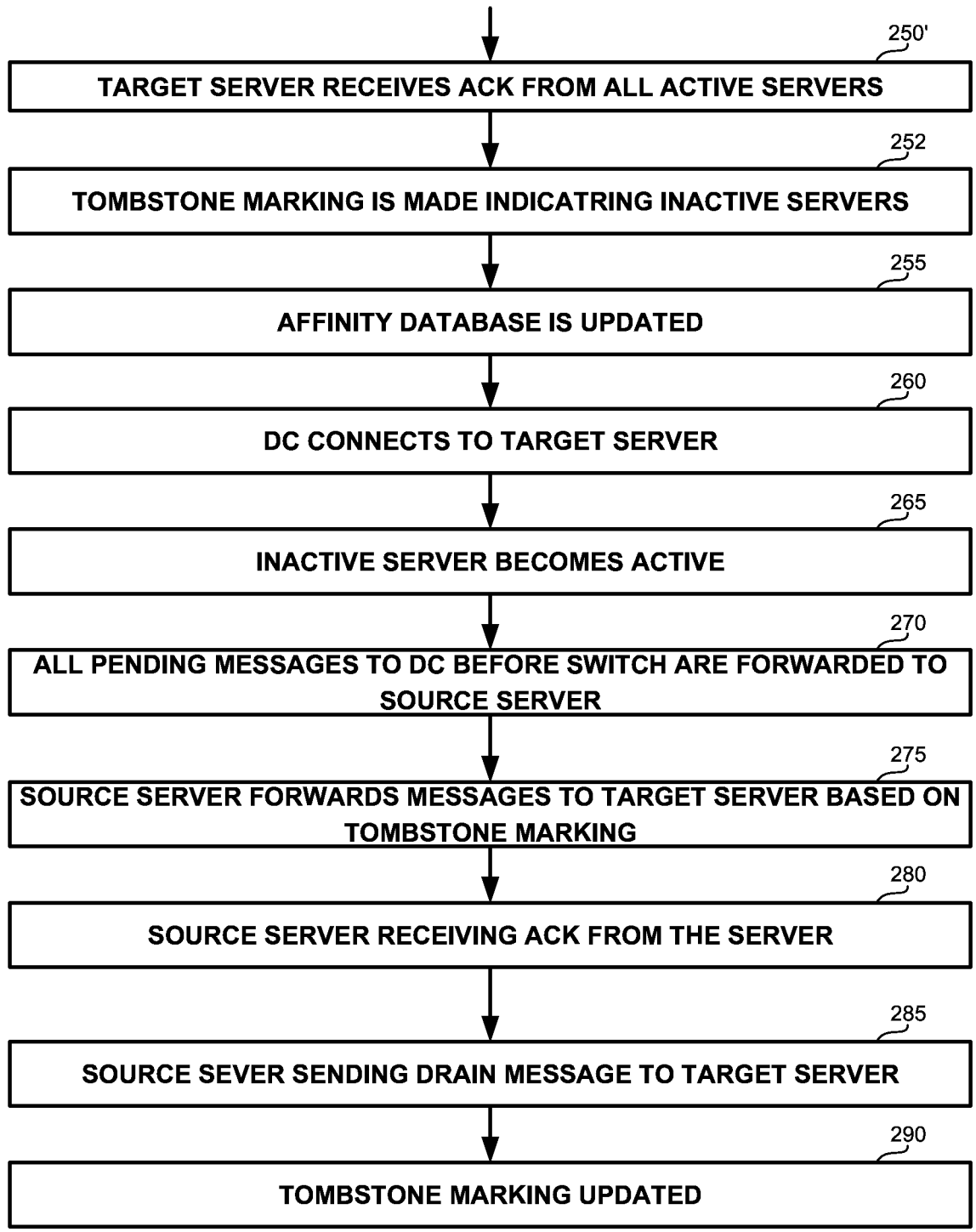

FIG. 2A showing a flowchart diagram of a method, in accordance with some exemplary embodiments of the disclosed subject matter; and FIG. 2B shows a flowchart diagram of a method, in accordance with some exemplary embodiments of the disclosed subject matter.

DETAILED DESCRIPTION

One technical problem dealt with by the disclosed subject matter is to provide for migration of durable clients in clustered publish/subscribe systems. In some exemplary embodiments, it may be desired to provide for migration of durable clients without disrupting traffic to other uninvolved clients. Additionally or alternatively, it may be desired to provide for migration with a minimal downtime of the migrating durable client.

Publish/subscribe (pub/sub) is a communication paradigm allowing users that produce and consume messages to interact in a decoupled fashion. In a topic-based pub/sub, message producers, also called "publishers", publish their messages on logical channels called "topics". Message consumers, also called "subscribers", subscribe to the topics that are of interest to them, and receive messages published on those topics of choice. Publishers and subscribers are decoupled because they need not know the network address of one another, only the topic identifier on top of which they communicate. pub/sub can be used to support many-to-many communication in a wide variety of popular Internet applications, such as enterprise application integration, stock-market monitoring engines, RSS feeds, on-line gaming, and many others. A "client" may act as a subscriber, consuming messages, as a publisher, publishing messages, or as both.

In some cases, the pub/sub system is based on a cluster of brokers, also referred to as servers, that is tasked with collectively providing the publish-subscribe service to a potentially large group of clients. In some cases, the protocol of the pub/sub system may define that a message published on a given topic by a client connected to one broker, must be received by all the clients subscribed to this topic, regardless of the broker they are connected to. In order to achieve that, a broker forward messages published by local clients (client connected to the said broker directly) to the brokers that are connected to clients that subscribed on the same topic. Forwarding may be performed in a broadcast manner or using routing tables indicating for each broker which topics his subscribers subscribed to.

A durable client, such as indicated in MQTT be setting a "cleanSession" flag to false, is a client that receives all messages published on the topics it subscribed to, regardless on its connectivity status when the messages were published. The broker may keep all the subscriptions of a durable client even when the client is disconnected from the broker and may continue to queue relevant messages (e.g., messages that match the subscriptions of the durable client) for the durable client. When the durable client reconnects, the broker may deliver the queued messages to the durable client.

In a cluster of brokers, a single broker is in charge of maintaining the message queue for the durable client, such as the broker to which the durable connected to initially. When the durable client reconnects, it reconnects to the same broker in order to receive the messages that the broker (potentially) saved for it, and resume receiving messages from the subscriptions it issued in the prior session. When a client that reconnects to the cluster needs to reconnect to a particular broker we say that the cluster requires "client affinity" (to a broker). In some exemplary embodiments, an affinity database may indicate client affinity of durable clients to brokers.

In some exemplary embodiments, the pub/sub system may implement load balancing, either using a dedicated load balancer, or by the brokers themselves. In case of a durable client, regardless of the current load, the durable client may be connected to the server based on the affinity database. When a client with a durable session reconnects, the load balancing mechanism may redirect the durable client to the broker it last connected to—the broker that holds its state. When a new client connects, the load balancing mechanism may connect it to a broker such that the load on the cluster as a whole is balanced; for example, by connecting it to the least loaded broker. In some cases, the load on the cluster may become uneven—e.g. one broker is heavily loaded while another is lightly loaded—and it is required to migrate/move clients from one broker to the next.

Migration of a durable client presents a challenge. When the durable client reconnects to the new broker, it must receive all the messages that were queued for it by the subscriptions it issued in the durable session: messages that were queued for it while it was connected to the first broker, disconnected, and then connected to the second broker.

Another technical problem is performing migration of the durable client while maintaining a pre-defined Quality of Service (QoS) level. In some exemplary embodiments, there is a QoS definition that defines a QoS level the system should provide. The QoS definition may require that the messages will be delivered in order, without any loss, without duplicates, or the like. As an example, MQTT defines QoS 0 as "at most one"—messages are delivered according to the best efforts of the operating environment; Message loss can occur, but not duplicates. QoS 1—where messages are assured to arrive but duplicates can occur; and QoS 2—where message are assured to arrive exactly once.

One technical solution is to implement the migration of the durable client without disrupting traffic relating to other clients. The relevant servers may be notified of the migration, and a marker may be used to differentiate between messages preceding the migration in the view of the server, and messages succeeding the migration.

In one embodiment, the migration may be from a first server to a second server. The first server may send the subscription information of the client to the second server. The second server may establish a message queue for the durable client on the second server, so that it may transmit messages to the durable client. The second server may transmit a switch (SWITCH) command to all servers of the cluster. In some cases, the transmission is to all active servers and inactive servers are only later notified. Each server receiving a switch command may send an acknowledgement (ACK) to both the first and the second servers, thereby providing a switch point marker with respect to that (receiving) server. In some cases, the ACK may be added to the forwarding queues of the server to the first and second servers in an atomic manner, ensuring synchronization between the two servers with respect to the acknowledging server. The first server may receive the ACK from the server, and may stop sending messages arriving from that server to the durable client. From that point onwards, the second server may be the one who transmits the messages originating from the acknowledging server. In some cases, the first server may accumulate the messages until all servers acknowledge the switch, so as to be able to handle with abortion of the migration process.

In some cases, a tombstone indication may be set in the first server, to indicate deprecated durable client. The tombstone may be useful for redirecting the durable client if it attempts to reconnect. In some cases, the tombstone may also include indications of all inactive servers which did not complete the switch before the client migrated and be used to ensure correct handling of messages that such inactive servers may retain and which should be provided to the durable client.

One technical effect of utilizing the disclosed subject matter may be a minimal disruption to the traffic of clients that remain in place with a short disconnect time to the client that is migrated. Traffic to non-involved clients is not paused in any manner, and such clients continue to receive messages relevant thereto, even if such messages originate from servers that are involved in the migration process (e.g., the source server from which the client migrates, and the target server, to which the client migrates).

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Figure 1A:
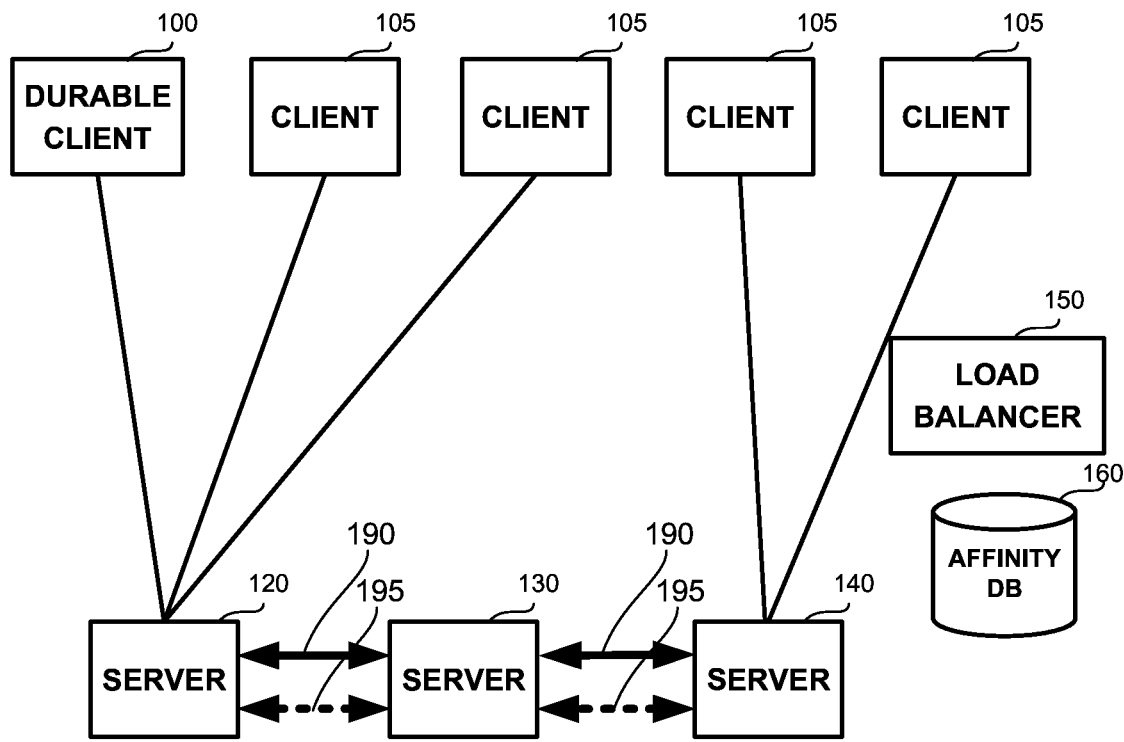
FIG. 1A shows a computerized environment, in accordance with some exemplary embodiments of the disclosed subject matter.

Referring now to FIG. 1A showing a computerized environment, in accordance with some exemplary embodiments of the disclosed subject matter.

A cluster of pub/sub brokers is shown and exemplified using three servers (Servers 120, 130, 140). The cluster may comprise any number of brokers. Several Clients 105 are connected to the cluster. Each connected to a potentially different server.

Durable Client 100 is connected and associated with Server 120. Server 120 may retain a queue of messages to be used to retain messages that are to be delivered to Durable Client 100 when such client is disconnected. Upon re-connection, the queue is processed to ensure all messages are transmitted to Durable Client 100.

Load Balancer 150 may be configured to match a server to a newly connected client. When a client attempts to connect to the cluster, Load Balancer 150 may direct the client to a server so as to distribute the load between the servers of the cluster. However, if the client is a durable client, which is already assigned to a server, as indicated in an Affinity Database 160, the Load Balancer 150 may re-direct the client to the same server. In the present example, if Durable Client 100 is disconnected and reconnects to the cluster, Durable Client 100 will be directed to Server 120 even though Server 120 is serving several clients, while Server 130 is not serving any client.

It will be noted that Load Balancer 150 may be implemented as a separate device, serving as a gateway to the cluster. Additionally or alternatively, Load Balancer 150 may be implemented on the servers themselves and upon a new connection, such module may decide to redirect to newly connecting client to a different server.

In some exemplary embodiments, each server can communicate with each other server. In some exemplary embodiments, such as in accordance with MQTT protocol, there may be two communication channels.

In some exemplary embodiments, a Control Channel 195, may be a channel that is used to disseminate local subscriptions to all other servers in order to facilitate routing. Using the Control Channel 195, the server may notify other servers which topics his subscribers are interested in, and as a result, the other servers may know which messages to send to the server for distribution. In some exemplary embodiments, the Control Channel 195 may have two send options: a broadcast option, and a point-to-point option. The control channel may be First-In First-Out (FIFO) ordered per source. The Control Channel 195 may be volatile, such that all in flight messages and queues are discarded when a server gets disconnected from the cluster.

In some exemplary embodiments, a messaging channel, also referred to as a Forwarding Queue 190, may be used to forward data messages between every pair of servers. In a cluster of N server, each sever may maintain N−1 Forwarding Queues 190, one per other servers. In some cases, such as when QoS level requires guaranteed delivery, the Forwarding Queues 190 are reliable and persistent.

Figure 1B:
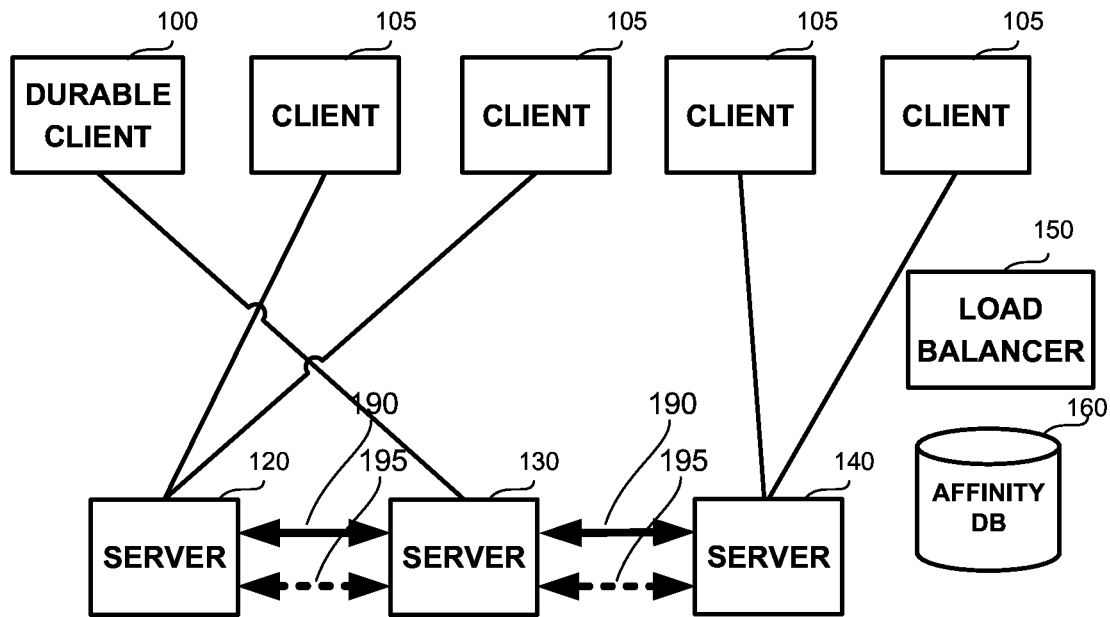
FIG. 1B shows a computerized environment, in accordance with some exemplary embodiments of the disclosed subject matter.

FIG. 1B exemplifies the computerized environment after Durable Client 100 is migrated from Server 120 (also referred to as the source server) to Server 130 (also referred to as the target server). The Affinity Database 160 may be updated to indicate the association of Durable Client 100 with Server 130 instead of Server 120.

In some exemplary embodiments, the migration is performed without delaying delivery of messages to other clients (e.g., Clients 105), and without interrupting the operation of other servers (e.g., Server 140). In some exemplary embodiments, the migration also does not adversely affect delivery of messages submitted by clients connecting to the source or target servers. In some exemplary embodiments, the migration also does not adversely affect delivery of messages delivered to clients connecting to the source or target servers.

It is noted there may be multiple alternative patterns in which the durable client is directed to its associated server. In one case, the client may perform a look up in Affinity Database 160 to identify its associated server. In such a case, the client may not communicate with Load Balancer 150. In another case, the client may connect to any load balancer, such as 150. Load Balancer 150 may perform the look-up in Affinity Database 160 to determine the associated server and may establish the connection thereto. In yet another case, the client may connect to a server. The server may perform the lookup in the Affinity Database 160 to determine to associated server. The server may then redirect the client to the correct server according to Affinity Database 160.

Referring now to FIG. 2A showing a flowchart diagram of a method, in accordance with some exemplary embodiments of the disclosed subject matter.

On Step 210, the information regarding the durable client to be migrated (referred to as DC) is gathered, encapsulated and transferred to the target server for processing. The state of the DC, such as the set of subscriptions the DC is subscribed to, may be serialized and transferred to the target server.

On Step 215, the target server may de-serialize the packet to obtain the information. The target server may create the subscriptions of the durable client on the target server. The target server may establish a queue for the durable client, where messages may be retained until they are ready for transmission to the durable client, such as upon reconnection thereof.

On Step 220, the target server may send a SWITCH command. The SWITCH command may be sent over a non-volatile queue, such as the forwarding queue. The SWITCH command may indicate the source server, also referred to as $s_1$, and the target server, also referred to as $s_2$. The SWITCH command may be transmitted to all other servers of the cluster. e.g., in a cluster of n servers, denoted as Si, the message is sent to each server $s_k$, $1<k<n$.

Upon receiving the SWITCH commands, each server sends an ACK message to both the source server (s1) and the target server (s2). The ACK message may be sent over a non-volatile queue, such as the forwarding queue. In some cases, the ACK message has a parameter indicating the acknowledging server (e.g., $ACK(s_k)$ is indicative that $s_k$ acknowledged the switch). In some exemplary embodiments, the ACK is first added to the forwarding queue of the target server and only then to that of the source server. Such an order may ensure that in no circumstance, the source server will drop a message originating from $s_k$ under the wrong assumption that such message is already handled by the target server. Additionally or alternatively, the ACK may be added to both forwarding queues in an atomic manner. Such atomic operation may be achieved by locking both queues and thereby preventing an additional message to be placed in between the time the ACK is placed for one server and the time the ACK is placed in the queue for the other server. In some exemplary embodiments, such atomicity may enable providing QoS level where duplication of messages is prohibited.

Steps 230-235 may be performed for each ACK received by the target server from different servers. On Step 230, the target server receives $ACK(s_k)$. The $ACK(s_k)$ message may be placed into the queue of the durable client to server as a marker. Additionally or alternatively, another marker may be used instead of the ACK message itself. Before the $ACK(s_k)$, the target server may have dropped every message from $s_k$ which was intended to the durable client. In some cases, such messages may have been transmitted to other clients based on their subscriptions, however, the message would not be sent by the target server to the durable client. As of receiving the ACK message, the target server is in charge of transmitting all relevant messages that originate from $s_k$ to the durable client. The target server may start accumulating messages in the queue of the durable client (Step 235). In some exemplary embodiments, the messages may be tagged by a source identifier (e.g., $s_k$).

Steps 240-245 may be performed for each ACK received by the source server. On Step 240, source server receives ACK and inserts a marker to the queue of the durable client. In some exemplary embodiments, the marker may be the ACK itself or a different message. On Step 245, the source server stops transmitting messages originating from $s_k$ to the durable client. In some exemplary embodiments, the source server stops adding such messages to the queue of the durable client used by the source server to ensure delivery of the messages. In some exemplary embodiments, and in order to cope with possible abortion of the migration process, the source server may accumulate the messages. In some exemplary embodiments, from the switch point onwards, the messages may be tagged by a source identifier (e.g., $s_k$). In some cases, upon transmitting all messages to the durable client from the server $s_k$, a DRAIN message may be transmitted to the target server, indicating all messages originating from server $s_k$ that preceded the acknowledgement of the switch by $s_k$ were delivered to the durable client. As of that time, the target server may be notified that it is in charge of delivering every future message originating from $s_k$.

On Step 250, the target server receives ACK from all servers of the cluster. Target server may also wait until receiving all DRAIN notifications regarding all such servers from the source server. After such time, all messages transmitted by each server before being notified of the migration were already handled and provided to the durable client, and each message succeeding such point in time, is already processed and ready for transmission by the target server.

On Step 255, the affinity database may be updated, to indicate the affinity of the durable client to the target server instead of the source server.

On Step 260, the durable client connects to the target server. In some cases, the cluster may force disconnection, and upon attempting to re-connect, the durable client may be directed to connect to the target server based on the content of the affinity database. Upon connection, the target server may transmit the messages retained for the durable client in the designated queue.

Referring now to FIG. 2B showing an alternative embodiment, in accordance with the disclosed subject matter. In FIG. 2B, some of the servers may be inactive when the migration is performed. In case the SWITCH command is transmitted over non-volatile channel, the SWITCH command will reach the inactive server, when such server reconnects to the cluster.

On Step 250', the target server receives ACK messages from all active servers. Servers that are part of the cluster and which are not currently active may still be unaware of the migration. However, the migration may not be delayed until they reconnect. In some cases, it may be unfeasible to wait for all servers to be connected at the same time.

On Step 252, a tombstone marking is made. In some exemplary embodiments, the tombstone marking may be made in the source server, in the target server, in both servers, or the like. The tombstone marking may include information in a server about clients that are no longer connected thereto. In some cases, the tombstone marking may indicate the durable client and its subscriptions. The tombstone marking may be used in case the durable client does reconnect to the source server, to force disconnection or redirection. In some exemplary embodiments, the tombstone marking may indicate inactive servers. In some exemplary embodiments, the tombstone marking may comprise a list of inactive servers from which an ACK message was not yet received.

After the migration is completed (Step 260), an inactive server may become active again. Steps 265-290 indicate steps to be performed with respect to each inactive server that becomes active.

On Step 265, the inactive server, referred to as rejoining server becomes active. The rejoining server may join the cluster of servers when becoming active. The rejoining server may have been inactive due to it being offline, having no connectivity, being rebooted, being taken off the cluster for maintenance, or due to any other reason. When the rejoining server becomes active, persistent information in relevant queues may still be available thereto, including messages in forwarding queues to other servers. In some cases, the forwarding queues may retain messages directed at the first server, which are to be delivered to the durable clients. For example, in view of the subscriptions of the durable client, the rejoining server had a routing table indicating that messages related to topic t to which the durable client is subscribed are to be transmitted to the first server. The same message may also be of interest to other clients of the first server. The same message may or may not be of interest to clients of the second server and accordingly, may or may not be queued in the forwarding queue of the second server. In addition, the rejoining server may also receive additional messages, which were not yet delivered thereto because of it being inactive. In some cases, the additional messages may also include the SWITCH command.

On Step 270, all pending messages that are relevant for the durable client and that are from the rejoining server are forwarded to the source server. The rejoining server may have retained messages that match the topics of the durable client. Such messages are to be delivered to the durable client. For this purpose, and as at the relevant time, the rejoining server is unaware of the migration, the messages are forwarded to the source server albeit the migration had already been concluded. Only upon receiving the SWITCH command, the rejoining server is aware of the migration, and starts forwarding relevant messages to the target server and not to the source server. In some exemplary embodiments, the SWITCH command may include or may be followed by a command to update the routing table, thereby ensuring that future messages are routed correctly, based on their topic and based on the subscribers in each server after the migration.

On Step 275, the source server receives the messages from the rejoining server, and forwards them to the target server for delivery to the durable client. The source server utilizes the tombstone marking to determine whether a message received from the rejoining server is relevant for the durable client. The tombstone marking indicates that the rejoining server did not complete the migration process, and therefore the source server knows it should check for the relevancy of the messages to the durable client. The relevancy to the durable client is determined using the tombstone marking which indicate the subscriptions of the durable client. Messages forwarded by the source server are received by the target server, who forwards them to the durable client, based on the subscription information thereof.

On Step 280, after the rejoining server receives the SWITCH command, it sends an ACK message to the source and target servers. When the source server receives the ACK message it knows that the rejoining server will no longer send additional messages relevant to the durable client thereto, but instead will send them directly to the target server.

Source server may still have pending messages which originated in the rejoining server and which should be delivered to the durable client. When all such messages are delivered to the target server, the source server sends a DRAIN message (Step 285), indicating that it had completed sending all messages from the rejoining server. The DRAIN message may have a parameter indicating the identity of the relevant server (e.g., $s_k$).

On Step 290, the tombstone marking may be updated. The tombstone marking may be updated to remove the rejoining server from the list of servers that have not yet completed the migration. The tombstone marking may be retained in the source server and may be updated thereby.

After all inactive servers rejoin the cluster and Steps 260-290 are performed with respect thereto, the tombstone is updated to not include any information regarding inactive servers. In some exemplary embodiments, the tombstone may include only information regarding the durable client, such as the identity of the client and the subscriptions thereof. Additionally or alternatively, the tombstone may include only the identity of the durable client without indicating its subscriptions. Additionally or alternatively, the tombstone marking may be removed altogether.

In some exemplary embodiments, the tombstone may include information about the durable client as was when the durable client had migrated. After the migration, the durable client may update its subscriptions, such as add subscriptions, remove subscriptions, or the like. However, the tombstone may indicate the state of the durable client when the migration occurred, as such state is useful in routing old messages that may have been relevant to the durable client and should be routed thereto. Additionally or alternatively, the tombstone marking may be updated to include the current state of the durable client to increase efficiency by avoiding forwarding messages that were relevant to the durable client at some point, but are no longer relevant. Such messages, when received by the target server, who holds the up-to-date state of the durable client, may be dropped and not forwarded to the durable client. However, updating the tombstone marking may require bookkeeping by the target server's part to indicate servers from which its durable client migrated from, and that may still send it messages (e.g., the migration was committed but is incomplete due to inactive servers).

In some exemplary embodiments, the durable client may become disconnected before or during the migration, before the source server manages to stream to the durable client all messages that arrived before all of the ACK messages are received. In such a case, the source server may start streaming all the messages that are to be delivered to the durable client to the target server. After sending all such messages, the source server may send a DRAIN message to the target server. Once the durable client reconnects the cluster, it is directed to the target server, which may then start streaming the messages received from the source server before streaming other messages that are to be routed to the durable client which were received from other servers.

AN EMBODIMENT

Below, a non-limiting embodiment is disclosed.

In the embodiment, a single entity coordinates the migration of the durable client. The entity may be an external controller or, as in the following description, the server from which the clients migrate, denoted as broker $s_1$. Commands (in CAPITAL) are sent on the control channel.

First an implementation where servers are active is disclosed.

Server $s_1$ sends a control command to server $s_2$: MIGRATE_CLIENT(Client-id $c_1$, Subscription-set $subs_1$, Server-set s-active, Server-set s-inactive, Integer migration-id). Client-id is a unique id across the cluster. Subscription-set is the set of client subscriptions, each subscription tagged with an identifier sub-id. Server-set is a set of server unique identifiers, migration-id is a unique id across the cluster. S-active indicates all active servers, S-inactive indicates all inactive servers.

Server $s_2$ checks that the view of the servers {s-active, s-inactive} is consistent with its own, creates the client $c_1$, creates the subscriptions $subs_1$, and responds to $s_1$ with MIGRATE_CLIENT_ACK(migration-id). If, on the other hand, the broker view differs, $s_2$ responds with MIGRATE_CLIENT_ABORT(migration-id), and $s_1$ will abort the procedure.

In some exemplary embodiments, as a result of $c_1$ being created on $s_2$, the modified subscriptions may be propagated via the control channel from $s_2$ to all other servers. Thereafter, messages start flowing into $c_1$'s queues on $s_2$, but are discarded at this stage.

Server $s_2$ sends a control message SWITCH(broker $s_1$, broker $s_2$, integer migration-id) to all servers, including inactive servers.

Server $s_2$ puts a SWITCH_ACK($s_2$, migration-id) into the forwarding queue of $s_1$ and the local queues for $c_1$, atomically. From this moment on, $s_2$ stops discarding messages from local clients and accumulates them into the local queues of $c_1$. The accumulated messages are tagged with the source ID (i.e. $s_2$).

When receiving a SWITCH($s_1$, $s_2$, integer migration-id) command the receiving broker $s_K$ (K !=1,2) puts a SWITCH_ACK($s_K$, migration-id) message on the forwarding queues of $s_1$ and $s_2$, atomically (i.e. lock both queues and insert the messages to both before unlocking the queues).

When receiving a SWITCH($s_1$, $s_2$, integer migration-id) command, server $s_1$ puts a SWITCH_ACK($s_1$, migration-id) into the forwarding queue of $s_2$ and the local queues for $c_1$, atomically.

When a SWITCH_ACK($s_K$, migration-id) message arrives to server $s_2$ it is inserted into $c_1$'s queue(s), it stops discarding messages from $s_K$ and starts accumulating them in $c_1$'s local message queue(s). The accumulated messages are tagged with the source ID (i.e. $s_K$).

When a SWITCH_ACK($s_K$, migration-id) command arrives to server $s_1$, it is inserted into $c_1$'s queues. $s_1$ will not deliver to $c_1$ messages from $s_K$ that arrived after the SWITCH($s_K$), but will keep accumulating them into the queue(s). From the first switch onwards the accumulated messages are tagged with the source ID (i.e. $s_K$).

If a SWITCH_ACK is not received from an active server within a certain timeout, $s_1$ will send MIGRATE_CLIENT_ABORT(migration-id) to server $s_2$ and abort the procedure; $s_2$ will do the same.

If client $c_1$ is connected, server $s_1$ waits until all the messages from $s_K$ that arrived prior to the SWITCH_ACK ($s_K$, migration-id) are delivered to the client $c_1$; for all brokers $s_K$ that are in the s-active set.

If on the other hand, client $c_1$ is disconnected (or disconnects during the migration): server $s_1$ will start forwarding the messages from $s_K$ to $s_2$, on the forwarding channel, encapsulate with the following metadata: STATE_EXCHANGE(migration-id, $c_1$, sK, sub-id, QoS, QoS-delivery-state, message).

When $s_1$ either delivers (to $c_1$) or forwards (to $s_2$) all the messages up to SWITCH_ACK($s_K$, migration-id), it will send SWITCH_DRAIN($s_K$, migration-id) to $s_2$ on the forwarding channel.

Server $s_2$ waits until it received a SWITCH_ACK($s_K$, migration-id) message from every active server. If a SWITCH_ACK is not received from an active server within a certain timeout, $s_2$ sends MIGRATE_CLIENT_ABORT(migration-id) to server $s_1$ and abort the procedure; $s_1$, does the same.

Server $s_2$ waits until it receives a SWITCH_DRAIN($s_K$, migration-id) message from $s_1$ on every active server.

When $s_1$ had sent SWITCH_DRAIN($s_K$, migration-id) on every active server, there is no need to transfer any further state from $s_1$ to $s_2$. Broker $s_1$ sends to $s_2$ a COMMIT, $s_2$ responds with COMMIT_ACK. Additionally or alternatively, two phase commit may be performed.

Server $s_1$ marks $c_1$ with a "tombstone", clear the queues, and disconnects $c_1$. If $c_1$ tries to reconnect to $s_1$ it is either refused, or redirected to $s_2$.

Server $s_1$ updates the affinity database that the home of $c_1$ is now on $s_2$ instead of $s_1$.

When $c_1$ reconnects to the cluster, it is directed to $s_2$.

In some exemplary embodiments, a remote server may be inactive (e.g., s-inactive is not empty), the main flow is augmented in the following way.

The "tombstone" marked by $s_1$, includes a "tail-tombstone" that also records the set inactive servers, and does not delete the queues or subscriptions. Likewise, $s_2$ mark the $c_1$ client with "tail-pointers" to the set of inactive servers s-inactive.

When a remote server $s_K$ recovers and rejoins the cluster, it may have messages in its persistent forwarding queue to $s_1$ that match the subscriptions of $c_1$. It also eventually gets the SWITCH command from $s_2$ and responds accordingly with a SWITCH_ACK($s_K$, migration-id).

When server $s_1$ receives messages from $s_K$ onto the $c_1$ queues, it forwards them to $s_2$ using STATE_EXCHANGE messages as described above. When $s_1$ reaches the SWITCH_ACK($s_K$, migration-id), $s_1$ sends a SWITCH_DRAIN ($s_K$, migration-id).

when $s_2$ receives STATE_EXCHANGE messages from $s_1$, $s_2$ delivers them to the respective $c_1$ queue.

When $s_2$ receives SWITCH_ACK($s_K$, migration-id), $s_2$ starts accumulating messages from $s_K$.

After $s_2$ receives SWITCH_DRAIN($s_K$, migration-id) from $s_1$, $s_2$ starts delivering accumulated message that arrived from $s_K$ after the SWITCH_ACK($s_K$, migration-id). Server $s_2$ sends SWITCH_DRAIN_ACK($s_K$, migration-id) to $s_1$.

Upon receiving SWITCH_DRAIN_ACK($s_K$, migration-id), $s_1$ removes $s_K$ from the tail-tombstone.

When the tail-tombstone remains with an empty s-inactive set, it degenerates to a regular tombstone.

In some exemplary embodiments, there may be concurrent migrations that are being processed. Each client migration may be marked with a migration identifier that is cluster-wide unique. It is therefore possible to conduct concurrent migrations for multiple clients independently without interference.

It is also possible to batch a migration of multiple clients $c_1, c2, \ldots, c_M$ from $s_1$ to $s_2$ by augmenting the MIGRATE_CLIENT command to be: MIGRATE_CLIENTS({Client-id c-m, Subscription-set subs-m} for m=[1, 2, ... M], Server-set s-active, Server-set s-inactive, Integer migration-id). In such an embodiment, the commit phase may be initiated when the SWITCH_ACK arrived at all the client queues involved in the migration.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the s presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for durable client migration from a first server in a cluster of publish/subscribe system to a second server of the cluster, the method comprising:
   the second server receiving subscription information of the durable client;
   the second server establishing a message queue for the durable client;
   the second server sending a switch command to all active servers of the cluster, the switch command related to routing a multiplicity of messages;
   in response to the second server obtaining, from an active server, an acknowledgement of the switch command, the second server inserting a marker to the message queue indicating switching point of the active server; and
   in response to the second server obtaining, from the first server, a message indicating the first server flushed all messages prior to respective switching points for all active servers, connecting the durable client to the second server and transmitting messages thereto by the second server;
   whereby the durable client is migrated from the first server to the second server without disrupting data traffic to uninvolved clients.

2. The method of claim 1 further comprises:
   in response to the second server obtaining, from the first server, an acknowledgement of the switch command, the second server inserting a marker to the message queue indicating switching point of the first server.

3. The method of claim 1, wherein the publish/subscribe system guarantees delivery of each message relevant to the durable client, regardless of a connectivity status of the durable client when each message is sent.

4. The method of claim 1, wherein the publish/subscribe system comprises an affinity database, wherein the affinity database indicates an affinity of the durable client to the first server, wherein the method further comprises updating the affinity database to indicate affinity of the durable client to the second server, wherein said updating is performed after the second server obtaining the message indicating the first server flushed all messages prior to respective switching points for all active servers.

5. The method of claim 4 further comprises: disconnecting the durable client from the first server after said updating; and connecting the durable client to the second server after said disconnecting, upon a connection request of the durable client.

6. The method of claim 1, wherein the active server sending the acknowledgement of the switch command to the first server and to the second server.

7. The method of claim 1, wherein the active server atomically inserting the acknowledgement of the switch command to forwarding queue of the first server and to a forwarding queue of the second server, whereby assuring each message associated with the active server is delivered to the durable client exactly once.

8. The method of claim 1 further comprises:
obtaining, by the second server, from the first server, undelivered messages, wherein the undelivered messages are messages that are intended for the durable client that were received by the first server before the switching point of the first server, wherein the first server is unable to deliver the undelivered messages to the durable client due to the durable client being disconnected during the durable client migration; and
wherein said transmitting message to the durable client by the second server comprises:
transmitting the undelivered messages; and
after transmitting the undelivered messages, transmitting messages arrived at the second server from a server after a switching point of the respective server.

9. A computer program product for migrating a durable client from a first server in a cluster of publish/subscribe system to a second server of the cluster, the computer program product comprising a non-transitory computer readable storage medium retaining program instructions, which program instructions when read by a processor, cause the processor to perform a method comprising:
the second server receiving subscription information of the durable client;
the second server establishing a message queue for the durable client;
the second server sending a switch command to all active servers of the cluster, the switch command related to routing a multiplicity of messages;
in response to the second server obtaining, from an active server, an acknowledgement of the switch command, the second server inserting a marker to the message queue indicating switching point of the active server; and
in response to the second server obtaining, from the first server, a message indicating the first server flushed all messages prior to respective switching points for all active servers, connecting the durable client to the second server and transmitting messages thereto by the second server;
whereby the durable client is migrated from the first server to the second server without disrupting data traffic to uninvolved clients.

10. The computer program product of claim 9, wherein the method further comprises:
in response to the second server obtaining, from the first server, an acknowledgement of the switch command, the second server inserting a marker to the message queue indicating switching point of the first server.

11. The computer program product of claim 9, wherein the publish/subscribe system guarantees delivery of each message relevant to the durable client, regardless of a connectivity status of the durable client when each message is sent.

12. The computer program product of claim 9, wherein the publish/subscribe system comprises an affinity database, wherein the affinity database indicates an affinity of the durable client to the first server, wherein the method further comprises updating the affinity database to indicate affinity of the durable client to the second server, wherein said updating is performed after the second server obtaining the message indicating the first server flushed all messages prior to respective switching points for all active servers.

13. The computer program product of claim 12, wherein the method further comprises: disconnecting the durable client from the first server after said updating; and connecting the durable client to the second server after said disconnecting, upon a connection request of the durable client.

14. The computer program product of claim 9, wherein the active server sending the acknowledgement of the switch command to the first server and to the second server.

15. The computer program product of claim 9, wherein the active server atomically inserting the acknowledgement of the switch command to forwarding queue of the first server and to a forwarding queue of the second server, whereby assuring each message associated with the active server is delivered to the durable client exactly once.

16. The computer program product of claim 9, wherein the method further comprises:
obtaining, by the second server, from the first server, undelivered messages, wherein the undelivered messages are messages that are intended for the durable client that were received by the first server before the switching point of the first server, wherein the first server is unable to deliver the undelivered messages to the durable client due to the durable client being disconnected during the durable client migration; and
wherein said transmitting message to the durable client by the second server comprises:
transmitting the undelivered messages; and
after transmitting the undelivered messages, transmitting messages arrived at the second server from a server after a switching point of the respective server.

* * * * *